(12) United States Patent
Ikeda et al.

(10) Patent No.: US 12,583,016 B2
(45) Date of Patent: Mar. 24, 2026

(54) METHOD FOR MANUFACTURING ELECTRODE, CLASSIFICATION SYSTEM, AND, ELECTRODE MATERIAL

(71) Applicant: TOYOTA JIDOSHA KABUSHIKI KAISHA, Toyota (JP)

(72) Inventors: Takenori Ikeda, Owariasahi (JP); Satoshi Moriyama, Nagoya (JP); Shugo Daikuhara, Nisshin (JP); Takeshi Kondo, Kariya (JP); Tomoyuki Tasaki, Kariya (JP); Tomokuni Abe, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 45 days.

(21) Appl. No.: 18/810,691

(22) Filed: Aug. 21, 2024

(65) Prior Publication Data

US 2024/0408646 A1 Dec. 12, 2024

Related U.S. Application Data

(62) Division of application No. 18/060,024, filed on Nov. 30, 2022, now Pat. No. 12,103,042.

(30) Foreign Application Priority Data

Jan. 20, 2022 (JP) ................................. 2022-007047

(51) Int. Cl.
| *B07B 1/42* | (2006.01) |
| *B07B 1/20* | (2006.01) |
(Continued)

(52) U.S. Cl.
CPC .................. *B07B 1/42* (2013.01); *B07B 1/20* (2013.01); *H01M 4/0409* (2013.01);
(Continued)

(58) Field of Classification Search
CPC ..... H01M 4/0404; H01M 4/0409; B07B 1/20; B07B 1/42; B07B 1/46; B07B 13/16; B02C 19/0056; B02C 23/16
(Continued)

(56) References Cited

U.S. PATENT DOCUMENTS

| 2,984,357 A | 5/1961 | Kufferath |
| 3,620,368 A | 11/1971 | Comis |
(Continued)

FOREIGN PATENT DOCUMENTS

| CN | 106249772 A | 12/2016 |
| CN | 214865038 U | 11/2021 |
(Continued)

OTHER PUBLICATIONS

Shugo Daikuhara, U.S. Appl. No. 17/862,986, filed Jul. 12, 2022.
(Continued)

*Primary Examiner* — Brian K Talbot
(74) *Attorney, Agent, or Firm* — Dickinson Wright, PLLC

(57) ABSTRACT

An electrode material containing active material powder is prepared. Dry classification of the electrode material is performed by a classifier. An electrode is manufactured by using the electrode material subjected to the dry classification. The classifier includes a mesh screen, a blade, and a motor. Breakage of the mesh screen is detected by monitoring either or both of an operation sound of the classifier and torque of the motor. The electrode material contained in the classifier will no longer be used for manufacturing of the electrode when breakage of the mesh screen is detected.

3 Claims, 5 Drawing Sheets

(51) Int. Cl.

| | |
|---|---|
| *H01M 4/04* | (2006.01) |
| *B02C 19/00* | (2006.01) |
| *B02C 23/16* | (2006.01) |
| *B07B 1/46* | (2006.01) |
| *B07B 13/16* | (2006.01) |
| *H01M 4/139* | (2010.01) |

(52) U.S. Cl.

CPC .......... *B02C 19/0056* (2013.01); *B02C 23/16* (2013.01); *B07B 1/46* (2013.01); *B07B 13/16* (2013.01); *H01M 4/0404* (2013.01); *H01M 4/139* (2013.01)

(58) Field of Classification Search

USPC ......................................................... 427/58

See application file for complete search history.

(56) References Cited

U.S. PATENT DOCUMENTS

| | | | |
|---|---|---|---|
| 3,905,897 | A | 9/1975 | Jacobson |
| 5,096,611 | A | 3/1992 | Matthew |
| 5,908,115 | A | 6/1999 | Govoni |
| 5,996,807 | A | 12/1999 | Rumpf |
| 6,997,325 | B2 | 2/2006 | DeCenso |
| 10,118,198 | B2 * | 11/2018 | Erickson ................... B07B 1/42 |
| 2002/0179500 | A1 | 12/2002 | Tsutsumi |
| 2009/0000994 | A1 | 1/2009 | Kato et al. |
| 2009/0281654 | A1 | 11/2009 | Largeaud |
| 2010/0282648 | A1 | 11/2010 | Bailey |
| 2011/0003206 | A1 | 1/2011 | Yura |
| 2013/0066019 | A1 | 3/2013 | Okuda |
| 2016/0001327 | A1 * | 1/2016 | Hagemeier ............... B07B 9/02<br>241/101.5 |
| 2022/0033275 | A1 | 2/2022 | Degura |
| 2022/0048076 | A1 | 2/2022 | Trojosky |

FOREIGN PATENT DOCUMENTS

| | | |
|---|---|---|
| JP | 2001243947 A | 9/2001 |
| JP | 2006278031 A | 10/2006 |
| JP | 2008006383 A | 1/2008 |
| JP | 2008100132 A | 5/2008 |
| JP | 2010064049 A | 3/2010 |
| JP | 2014102967 A | 6/2014 |
| JP | 2015082379 A | 4/2015 |
| JP | 2016517384 A | 6/2016 |
| JP | 2018032604 A | 3/2018 |
| WO | 2006043423 A1 | 4/2006 |
| WO | 2011115221 A1 | 9/2011 |
| WO | 2012026527 A1 | 3/2012 |
| WO | 2014/140326 A1 | 9/2014 |

OTHER PUBLICATIONS

Takenori Ikeda et al., U.S. Appl. No. 18/060,024, filed Nov. 30, 2022.

Takenori Ikeda et al., U.S. Appl. No. 18/060,024, Restriction Requirement dated Oct. 13, 2023.

Takenori Ikeda et al., U.S. Appl. No. 18/060,024, Non-Final Office Action dated Jan. 29, 2024.

Takenori Ikeda et al., U.S. Appl. No. 18/060,024, Notice of Allowance dated Jun. 12, 2024.

Chen Ying: "Design of Intelligent Monitoring System for Multifunction Vibrating Screen and Application", vol. 39, No. 2, Apr. 30, 2021, pp. 67-70 (with English Abstract).

Partial translation of Office Action issued to Chinese Application No. 202310013327.1 on Apr. 14, 2025.

\* cited by examiner

METHOD FOR MANUFACTURING ELECTRODE, CLASSIFICATION SYSTEM, AND, ELECTRODE MATERIAL

CROSS-REFERENCE TO RELATED APPLICATION

The present application is a divisional of U.S. patent application Ser. No. 18/060,024 filed on Nov. 30, 2022, which claims priority to Japanese Patent Application No. 2022-007047 filed on Jan. 20, 2022. The disclosure of each of the above-identified applications, including the specification, drawings, and claims, is incorporated herein by reference in its entirety.

BACKGROUND

1. Technical Field

The present disclosure relates to methods for manufacturing an electrode, classification systems, and electrode materials.

2. Description of Related Art

Japanese Unexamined Patent Application Publication No. 2014-102967 (JP 2014-102967 A) discloses a filter for filtering a slurry for forming an active material layer.

SUMMARY

In the related art, an electrode is manufactured by application of a liquid paint. That is, a slurry is prepared by mixing an electrode material and a solvent. The electrode material can contain a binder, an electrically conductive material, etc. in addition to active material powder. An electrode is manufactured by coating a surface of a base material with the slurry.

The solvent can dissolve the binder. The solvent also serves as a dispersion media for solid particles. The solvent can include, for example, an organic solvent. It is desired from the standpoint of, for example, manufacturing cost, environmental loads, etc. to reduce solvent usage associated with electrode manufacturing. Therefore, a process that does not use slurry has also been proposed. For example, a powder paint is prepared by mixing active material powder and a binder. The powder paint is wet powder or dry powder. An electrode can be manufactured by coating a surface of a base material with the powder paint.

The active material powder is an agglomerate of active material particles. Active material particles cause electrode reactions. The active material powder ideally consists of active material particles. However, the active material powder can also contain a trace of foreign matter. Foreign matter is unintended impurities. Foreign matter contains metal. Foreign matter is considered to be generated by, for example, wear of equipment for producing active material powder. Foreign matter is in the form of particles. Foreign matter in the electrode may adversely affect battery performance. Such an influence of foreign matter tends to occur particularly when the foreign matter is coarse particles. For example, battery self-discharge may increase.

Foreign matter can contain magnetic matter. Magnetic matter can include, for example, iron (Fe), iron oxides, and stainless steel (SUS)-derived components. In the related art, after the active material powder is synthesized, magnetic force separation (hereinafter referred to as "magnetic separation") of the active material powder is performed to reduce magnetic matter. However, the separation efficiency of the magnetic separation is not high enough. For example, active material particles such as lithium cobalt oxide can also be magnetic. When active material particles are magnetic, the foreign matter separation efficiency may decrease. This is because the active material particles are also attracted to a magnet. There is also foreign matter that is not magnetic. For example, copper (Cu) is not magnetic. Hereinafter, "foreign matter containing magnetic matter and Cu" is sometimes referred to as "specific foreign matter."

In the related art, a slurry containing an electrode material is filtered with a filter to reduce specific foreign matter. However, this method cannot be applied to powder paints (wet powder, dry powder).

The present disclosure provides a method for manufacturing an electrode, a classification system, an electrode material, and an electrode that reduce specific foreign matter (magnetic matter, Cu).

Technical configurations and functions and effects of the present disclosure will be described below. An action mechanism according to the present specification includes estimation. The action mechanism does not limit the technical scope of the present disclosure.

1. In a method for manufacturing an electrode according to a first aspect of the present disclosure, an electrode material containing active material powder is prepared, dry classification of the electrode material is performed by a classifier, and an electrode is manufactured by using the electrode material subjected to the dry classification.

The classifier includes a mesh screen, a blade, and a motor. The mesh screen has a tubular outer shape. The mesh screen is electrically insulating. The mesh screen is configured to separate coarse particles from the electrode material. The blade is configured to press the electrode material against the mesh screen. The motor is configured to rotate the blade along an inner peripheral surface of the mesh screen.

Performing the dry classification of the electrode material by the classifier includes detecting breakage of the mesh screen by monitoring either or both of an operation sound of the classifier and torque of the motor. Performing the dry classification of the electrode material by the classifier includes stopping using the electrode material contained in the classifier for manufacturing of the electrode when the breakage of the mesh screen is detected.

According to the new knowledge of the present disclosure, specific foreign matter (magnetic matter, Cu) is coarse particles. The coarse particles can be separated from the electrode material by the dry classification. The dry classification can have high separation efficiency as compared to the method in which the slurry is filtered with a filter. That is, the specific foreign matter can be reduced as compared to the related art.

A mesh screen is used in the dry classification. Mesh screens tend to break easily. A broken mesh screen may allow the specific foreign matter to enter an electrode. That is, there is room for improvement in quality stability.

One possible method to detect breakage of a mesh screen is to monitor a change in electrical resistance of a mesh screen. That is, electrically conductive properties are given to the mesh screen. The electrical resistance of the mesh screen can increase when the mesh screen is broken. Breakage of the mesh screen can therefore be detected by an increase in electrical resistance. However, the electrode material can contain an electrically conductive material. When the electrode material contains an electrically conductive material, breakage of the mesh screen may not be able to be detected.

Therefore, breakage of the mesh screen is detected by the operation sound of the classifier and the torque of the motor. Breakage of the mesh screen can thus be detected even when the electrode material contains an electrically conductive material. By detecting breakage of the mesh screen, an electrode with a reduced content of specific foreign matter can be stably manufactured. That is, the quality is expected to be stabilized.

2. The electrode material may contain an electrically conductive material.

3. Performing the dry classification of the electrode material by the classifier may include detecting a frequency component derived from the breakage of the mesh screen by analyzing a frequency of the operation sound.

4. Performing the dry classification of the electrode material by the classifier may include determining that the breakage has occurred when the torque falls out of a reference range.

5. Manufacturing the electrode by using the electrode material subjected to the dry classification may include preparing a paint containing the electrode material, and coating a surface of a base material with the paint.

The paint may contain, in addition to the electrode material, at least one selected from the group consisting of an electrically conductive material, a solid electrolyte, a binder, and an additive.

6. The paint may have a solid content of 70% to 100% by mass fraction.

The paint with a solid content of 70% to 100% can be a powder paint (wet powder, dry powder). A liquid paint (slurry) can have a solid content of, for example, 60% or less.

7. The classifier may be stopped when it is determined that the breakage has occurred.

The mesh screen may be replaced after stopping the classifier.

Operation of the classifier may be resumed after replacing the mesh screen.

8. A second aspect of the present disclosure relates to a classification system that performs dry classification of an electrode material. The classification system includes a classifier and a detector.

The classifier includes a mesh screen, a blade, and a motor. The mesh screen has a tubular outer shape. The mesh screen is electrically insulating. The mesh screen is configured to separate coarse particles from the electrode material. The blade is configured to press the electrode material against the mesh screen. The motor is configured to rotate the blade along an inner peripheral surface of the mesh screen.

The detector is configured to detect breakage of the mesh screen by monitoring either or both of an operation sound of the classifier and torque of the motor.

9. The detector may be configured to detect a frequency component derived from the breakage by analyzing a frequency of the operation sound.

10. The detector may be configured to determine that the breakage has occurred when the torque falls out of a reference range.

11. The classification system may further include a controller. The controller may be configured to stop the classifier when the breakage is detected by the detector.

12. The detector may be configured to determine that the electrode material contained in the classifier is defective when the breakage is detected.

The detector may be configured to redetermine that the electrode material determined to be defective is non-defective when the electrode material determined to be defective is subjected again to the dry classification.

13. A third aspect of the present disclosure relates to an electrode material that includes active material powder. A content of magnetic matter in the active material powder is 4 ppm or less by mass fraction. A content of copper in the active material powder is 1 ppm or less by mass fraction.

14. A fourth aspect of the present disclosure relates to an electrode including the electrode material of the third aspect.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
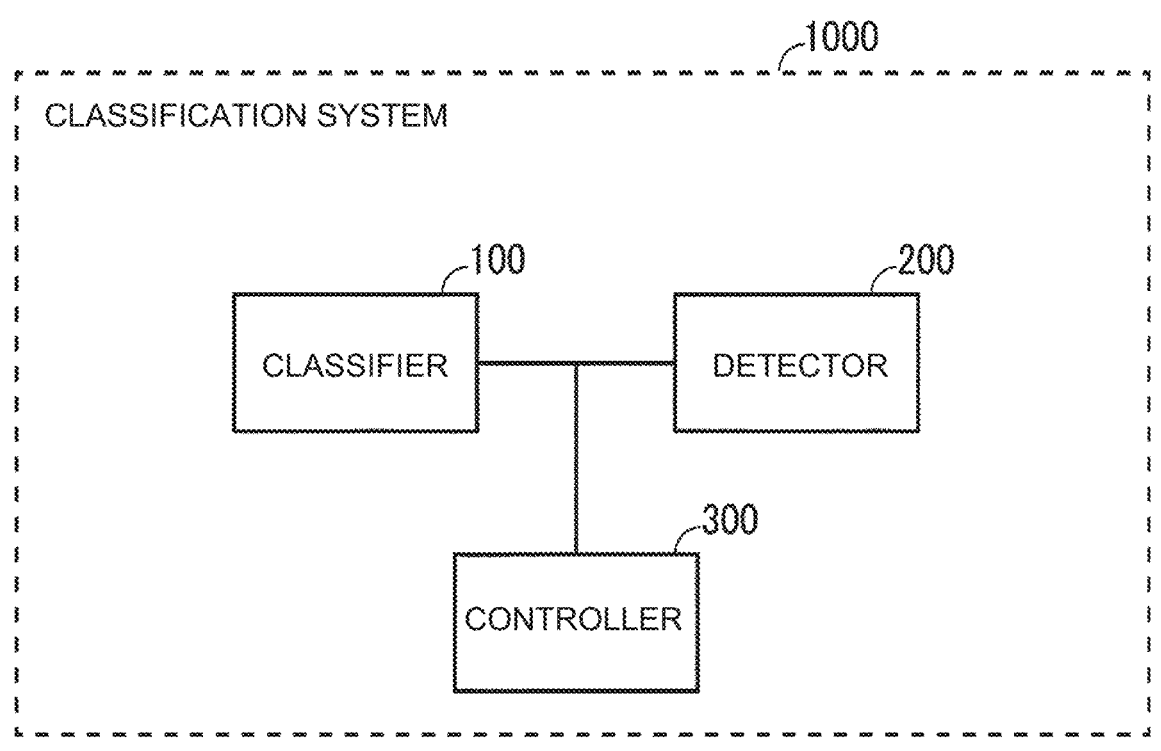
FIG. 1 is a block diagram of a classification system according to an embodiment.

Hereinafter, an embodiment of the present disclosure (hereinafter sometimes simply referred to as the "embodiment") and examples of the present disclosure (hereinafter sometimes simply referred to as the "examples") will be described. However, the embodiment and the examples are not intended to limit the technical scope of the present disclosure.

Definition of Terms, Etc

In the present specification, the terms "comprise," "include," "have," and variations thereof (e.g., "composed of") are open-ended. When any of the open-ended terms is used, it means that additional elements may or may not be included in addition to essential elements. The term "consist of" is closed-ended. However, even when the closed-ended term is used, it does not mean that additional elements such as normally accompanying impurities and elements irrelevant to the technique of the present disclosure are excluded. The term "substantially consist of" is semi-closed-ended. When the semi-closed-ended term is used, it means that it is allowed to add elements that do not substantially affect the basic and novel characteristics of the technique of the present disclosure.

In the present specification, the words such as "may" and "can" are used in a permissive sense, meaning that "it is possible," rather than in a mandatory sense, meaning "must."

In the present specification, elements in a singular form can also be plural unless otherwise specified. For example, the term "particle" can mean not only "one particle" but also an "agglomerate of particles (powder, powdery material, or group of particles)."

In the present specification, the order in which a plurality of steps, actions, operations, etc. included in various methods is performed is not limited to the described order unless otherwise specified. For example, a plurality of steps may proceed in parallel. For example, the order of a plurality of steps may be reversed.

In the present specification, the numerical ranges such as "m % to n %" are inclusive ranges including their upper and lower limit values unless otherwise specified. That is, "m % to n %" indicates the numerical range of "m % or more and n % or less." Further, "m % or more and n % or less" includes "more than m % and less than n %." A numerical value selected as desired from the numerical range may be set to a new upper limit value or a new lower limit value. For example, a new numerical range may be set by combining a numerical value in the numerical range and a numerical value shown in a different part of the present specification, in a table, in the drawings, etc.

In the present specification, all numerical values should be interpreted as having the term "about" in front of them. The term "about" can mean, for example, ±5%, ±3%, or ±1%. All numerical values can be approximate values that can vary depending on the manner in which the technique of the present disclosure is used. All numerical values can be expressed in significant figures. A measured value can be an average value of a plurality of measurements. The number of measurements may be three or more, five or more, or ten or more. It is generally expected that the larger the number of measurements, the higher the reliability of the average value. A measured value can be rounded off based on the number of significant figures. A measured value can include an error etc. due to, for example, the detection limit of a measuring device.

In the present specification, when a compound is represented by a stoichiometric composition formula (e.g., "$LiCoO_2$"), the stoichiometric composition formula is merely a representative example of the compound. The compound may have a non-stoichiometric composition. For example, when lithium cobalt oxide is represented by "$LiCoO_2$," lithium cobalt oxide is not limited to the composition ratio of "Li:Co:O=1:1:2" and can contain lithium (Li), cobalt (Co), and oxygen (O) at any composition ratio, unless otherwise specified. Moreover, doping with a trace element, substitution with a trace element, etc. can be allowed.

Geometric terms as used in the present specification (e.g., "parallel," "perpendicular," "orthogonal," etc.) should not be interpreted in a strict sense. For example, the term "parallel" may refer to the state deviating slightly from "parallel" in a strict sense. Geometric terms as used in the present specification may include, for example, tolerances, variations, etc. in terms of design, work, manufacturing, etc. The dimensional relationships in the drawings may not match the actual dimensional relationships. The dimensional relationships (length, width, thickness, etc.) in the drawings may have been changed in order to facilitate understanding of the technique of the present disclosure. Moreover, a part of the configurations may have been omitted.

The term "electrode" as used in the present specification is a general term for positive and negative electrodes. An electrode may be a positive electrode or a negative electrode. Electrodes can be applied to any desired battery system. In the embodiment, an example in which electrodes are applied to a lithium-ion battery will be described.

As used in the present specification, "D50" indicates the particle size at which the cumulative frequency reaches 50% in a volume-based particle size distribution when counted from the smallest particle size. Moreover, "D99" indicates the particle size at which the cumulative frequency reaches 99% in a volume-based particle size distribution when counted from the smallest particle size. D50 and D99 can be measured by a laser diffraction method.

In the present specification, particles have a minor axis and a major axis. The "major axis" refers to the distance between the farthest two points on the contour line of a particle image. The "minor axis" refers to the diameter orthogonally crossing the line segment of the major axis at the midpoint of the line segment. The minor axis is sometimes equal to the major axis.

The term "solid content" as used in the present specification refers to the total mass fraction of solid components in a paint. A component dissolved in a solvent (e.g., a polymer binder) is regarded as a solid component.

The term "slurry" as used in the present specification refers to a dispersed system of a solid (powder) in a liquid (solvent). The term "wet powder" refers to a dispersed system of a liquid (solvent) in a solid (powder).

In the present specification, the "volume resistivity (Ω·cm)" of powder can be measured by, for example, any of the "MCP-PD" series of powder resistivity analyzer made by Nittoseiko Analytech Co., Ltd. (or an equivalent product). The amount of sample is 2.0 g. The measurement load is 20 kN.

Classification System

FIG. 1 is a block diagram of a classification system according to the embodiment. Hereinafter, the "classification system according to the embodiment" is sometimes simply referred to as the "classification system." A classification system 1000 includes a classifier 100 and a detector 200. The classification system 1000 may further include, for example, a controller 300. The classifier 100, the detector 200, and the controller 300 may be separate and independent of each other, or may be integrated and indivisible.

Classifier

Figure 2:
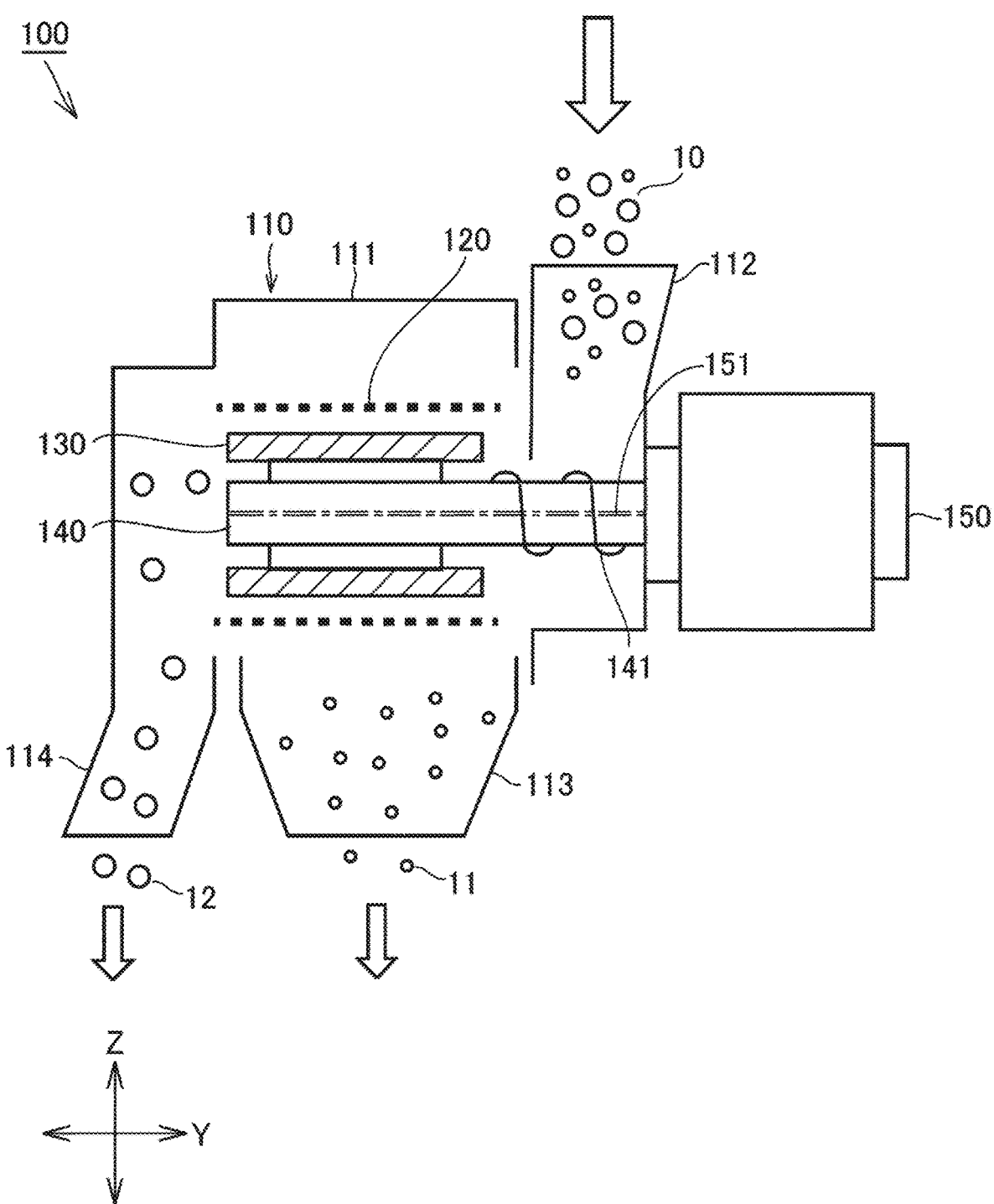
FIG. 2 is a first schematic sectional view showing an example of a classifier according to the embodiment.

FIG. 2 is a first schematic sectional view showing an example of the classifier according to the embodiment. The classifier 100 performs dry classification of an electrode material (powder material 10). The classifier 100 includes a housing 110, a mesh screen 120, blades 130, a rotor 140, and a motor 150.

The housing 110 includes a body portion 111, a supply portion 112, a first discharge portion 113, and a second discharge portion 114. The body portion 111 has a tubular outer shape. The body portion 111 may have a cylindrical outer shape. The body portion 111 houses the mesh screen 120, the blades 130, and the rotor 140. The supply portion 112 extends so as to guide the powder material 10 into the body portion 111. The first discharge portion 113 is located below the body portion 111. Fine particles 11 are discharged from the first discharge portion 113. The second discharge portion 114 is located on the side in the axial direction (Y-axis direction) of the body portion 111. Coarse particles 12 are discharged from the second discharge portion 114. The second discharge portion 114 extends so as to guide the coarse particles 12 downward.

The mesh screen 120 has a tubular outer shape. The mesh screen 120 may have, for example, a cylindrical outer shape. The mesh screen 120 is located inside the body portion 111. The axis of the mesh screen 120 may coincide with the axis of the body portion 111.

The mesh screen 120 is a mesh sieve. The mesh screen 120 separates the coarse particles 12 from the powder material 10. The size of the coarse particles 12 to be separated can be determined by the mesh size of the mesh screen 120. The mesh size of the mesh screen 120 can be adjusted so that the coarse particles 12 (specific foreign matter) are not allowed to pass through the mesh screen 120 and the fine particles 11 (electrode material) are allowed to pass through the mesh screen 120.

The fine particles 11 (electrode material) can have a D99 of less than 50 μm. The fine particles 11 may have a D99 of, for example, 30 μm to 40 μm. The coarse particles 12 (specific foreign matter) may have a minor axis of, for example, 50 μm or more. The minor axis of the coarse particles 12 may be, for example, two to 10 times, two to five times, or two to three times the D99 of the fine particles 11.

The mesh screen 120 is electrically insulating. The mesh screen 120 may be made of, for example, resin. The mesh screen 120 may be composed of, for example, at least one selected from the group consisting of polyester, polyamide, and polyarylate.

The motor 150 rotates a shaft 151. The shaft 151 is inserted through the rotor 140. Rotation of the shaft 151 causes the rotor 140 to rotate. The axes of the shaft 151, the rotor 140, and the mesh screen 120 may coincide with each other.

The rotor 140 includes a screw portion 141. The screw portion 141 is located below the supply portion 112. The screw portion 141 spirally extends on the surface of the rotor 140 along the rotation axis of the rotor 140. As the rotor 140 rotates, the screw portion 141 transports the powder material 10 into the body portion 111.

The blades 130 are connected to the rotor 140. Rotation of the shaft 151 causes the blades 130 to rotate along the inner peripheral surface of the mesh screen 120.

Figure 3:
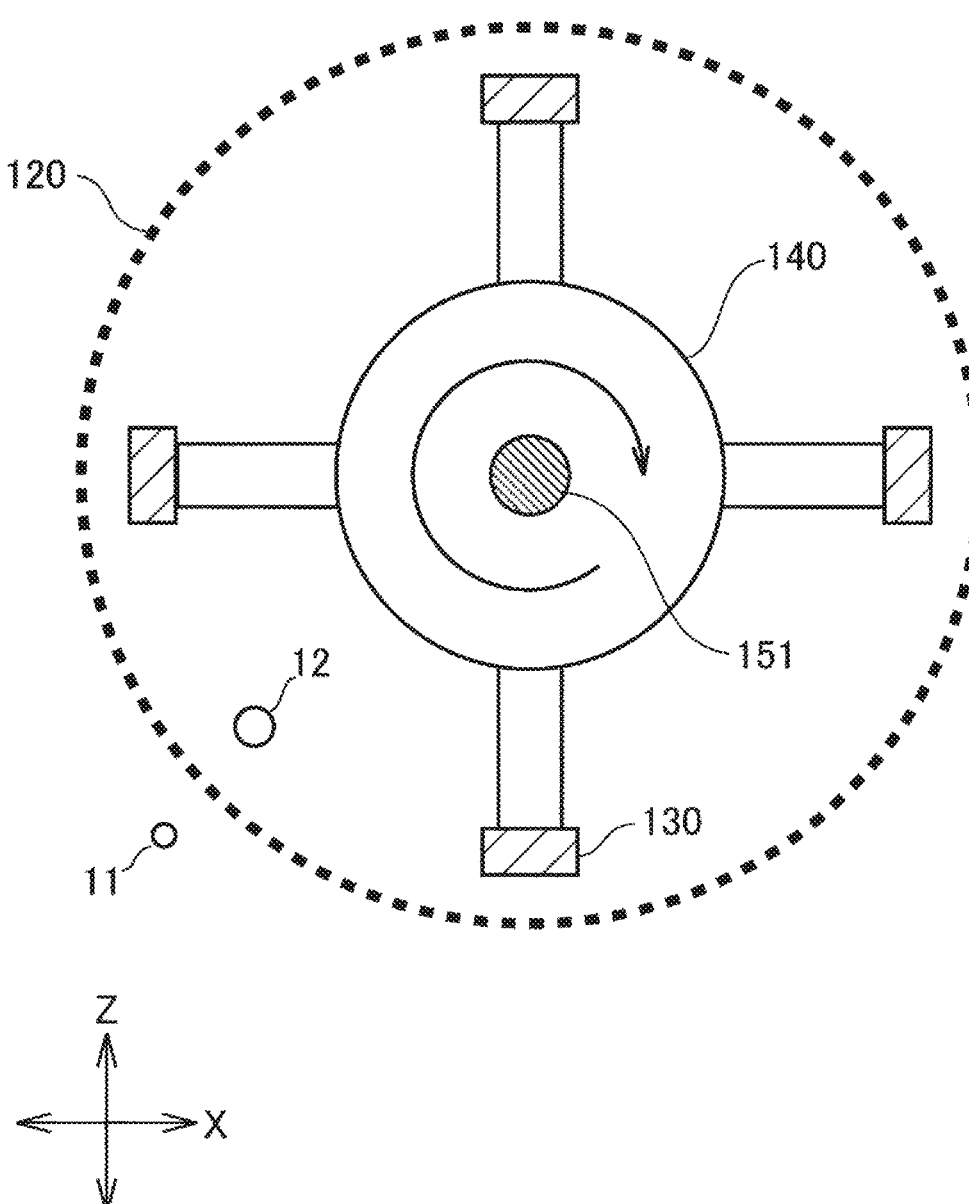
FIG. 3 is a second schematic sectional view showing an example of the classifier according to the embodiment.

FIG. 3 is a second schematic sectional view showing an example of the classifier according to the embodiment. The section of FIG. 3 is orthogonal to the rotation axis of shaft 151. The blades 130 may extend in, for example, a radial pattern from the shaft 151 toward the inner peripheral surface of the mesh screen 120. The blades 130 may be, for example, in the shape of a plate. As the blades 130 move along the inner peripheral surface of the mesh screen 120, the powder material 10 is dispersed onto the inner peripheral surface of the mesh screen 120. The powder material 10 is also pressed against the mesh screen 120. The fine particles 11 in the powder material 10 pass through the mesh screen 120 and are discharged from the first discharge portion 113. The coarse particles 12 in the powder material 10 cannot pass through the mesh screen 120. The coarse particles 12 move along the inner peripheral surface of the mesh screen 120 in the Y-axis direction. The coarse particles 12 are discharged from the second discharge portion 114.

For example, as the blades 130 press the powder material 10 against the mesh screen 120, an impact is applied to the mesh screen 120. For example, this impact may break the mesh screen 120. If the classifier 100 continues to operate after the mesh screen 120 is broken, the coarse particles 12 (specific foreign matter) may enter the first discharge portion 113 (non-defective side).

Detector

The detector 200 detects breakage of the mesh screen 120. The broken mesh screen 120 can change the operation sound of the classifier 100. The broken mesh screen 120 can change the torque of the motor 150. The detector 200 detects breakage of the mesh screen 120 by monitoring either or both of the operation sound of the classifier 100 and the torque of the motor 150. The detector 200 may monitor either the operation sound or the torque, or may monitor both the operation sound and the torque.

The detector 200 may include, for example, a sound sensor (not shown) and an analyzer (not shown). The sound sensor measures the operation sound of the classifier 100. The analyzer collects and analyzes data on the operation sound. The analyzer may analyze, for example, the frequency of the operation sound. The analyzer may decompose the data on the operation sound into frequency components by, for example, Fast Fourier Transformation (FFT). Of the frequency components thus obtained, the frequency component derived from breakage of the mesh screen 120 can be identified. Breakage of the mesh screen 120 can be detected by detecting this frequency component.

The detector 200 may include, for example, a torque sensor. The torque sensor measures the torque of the motor 150. The torque sometimes increases when the mesh screen 120 is broken. The torque sometimes decreases when the mesh screen 120 is broken. For example, a reference range (lower limit value, upper limit value) may be set for the torque. The torque can change within the reference range during steady operation. The torque may fall out of the reference range when the mesh screen 120 is broken. It may be determined that the mesh screen 120 is broken when the torque falls out of the reference range.

Controller

The controller 300 can control the operation and cooperation of each device. For example, the controller 300 may stop operation of the classifier 100 when the detector 200 detects breakage of the mesh screen 120. For example, the controller 300 may determine that the electrode material contained in the classifier 100 is defective when the detector 200 detects breakage of the mesh screen 120. For example, the controller 300 may cause the electrode material contained in the classifier 100 to be discharged into the second discharge portion 114 (defective side) when the detector 200 detects breakage of the mesh screen 120.

The defective material may be subjected again to the dry classification. The defective material subjected again to the dry classification may be determined to be a non-defective material.

Method for Manufacturing Electrode

Figure 4:
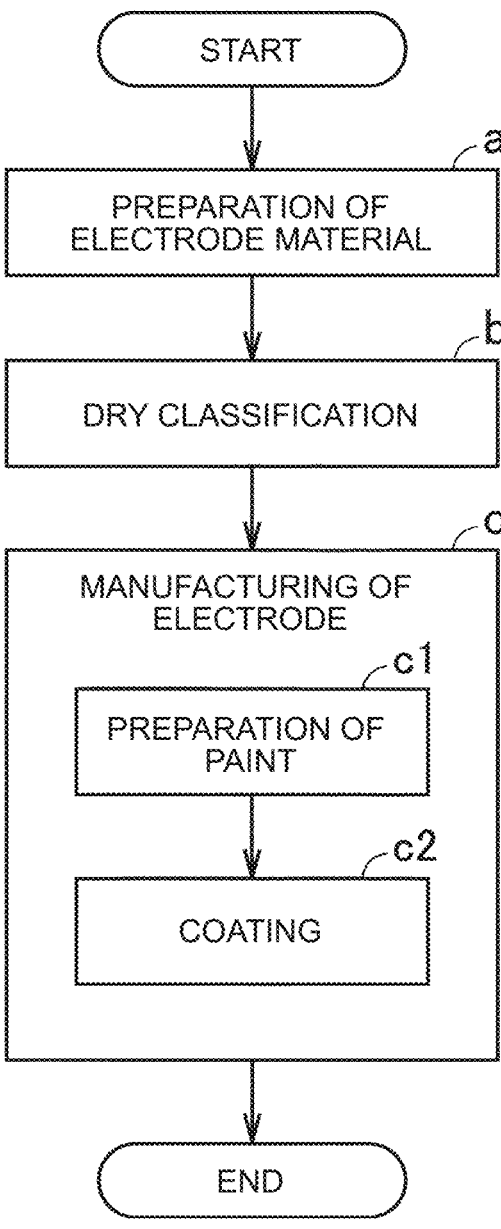
FIG. 4 is a schematic flowchart of a method for manufacturing an electrode according to the embodiment.

FIG. 4 is a schematic flowchart of a method for manufacturing an electrode according to the embodiment. Hereinafter, the "method for manufacturing an electrode according to the embodiment" is sometimes simply referred to as the "manufacturing method." The manufacturing method includes "(a) preparation of electrode material," "(b) dry classification," and "(c) manufacturing of electrode."

(a) Preparation of Electrode Material

The manufacturing method includes preparing an electrode material. The electrode material contains active material powder. The electrode material may consist of, for example, active material powder. The electrode material may contain an additional component(s). For example, the electrode material may contain, in addition to the active material powder, at least one selected from the group consisting of an electrically conductive material, a solid electrolyte, a binder, and an additive. The electrode material containing an additional component(s) such as a binder can also be referred to as "electrode mixture."

For example, the electrode material may be prepared by mixing at least one selected from the group consisting of an electrically conductive material, a solid electrolyte, a binder, and an additive with the active material powder. For example, the electrode material may be prepared by simple dry mixing. For example, the active material powder and other material(s) may be compounded by mechanochemical treatment etc.

Active Material Powder

The active material powder is a main component of the electrode material. In the electrode material, the active material powder may account for, for example, 50% to 100% by mass fraction. For example, the active material powder may have a D50 of, for example, 1 μm to 30 μm, or 5 μm to 20 μm.

The active material powder may be, for example, powder of a positive electrode active material. The positive electrode active material may contain, for example, at least one selected from the group consisting of $LiCoO_2$, $LiNiO_2$, $LiMnO_2$, $LiMn_2O_4$, $Li(NiCoMn)O_2$, $Li(NiCoAl)O_2$, and $LiFePO_4$. For example, "(NiCoMn)" in "$Li(NiCoMn)O_2$" indicates that the whole of the elements inside the parentheses is 1 in terms of the composition ratio. The individual components of "(NiCoMn)" can be contained at any composition ratio as long as the whole is 1. $Li(NiCoMn)O_2$ may include, for example, $Li(Ni_{1/3}Co_{1/3}Mn_{1/3})O_2$, $Li(Ni_{0.8}Co_{0.2}Mn_{0.3})O_2$, and $Li(Ni_{0.8}Co_{0.1}Mn_{0.1})O_2$.

The active material powder may be, for example, powder of a negative electrode active material. The negative electrode active material may contain, for example, at least one selected from the group consisting of graphite, soft carbon, hard carbon, silicon, silicon oxide, tin, tin oxide, and $Li_4Ti_5O_{12}$.

The active material powder may be magnetic. For example, active materials containing a transition metal element such as Fe, cobalt (Co), or nickel (Ni) can be magnetic. For example, $Li(NiCoMn)O_2$, $Li(NiCoAl)O_2$, and $LiFePO_4$ can be magnetic.

Electrically Conductive Material

The electrically conductive material may be in the form of powder. The electrically conductive material may include, for example, electrically conductive carbon particles and electrically conductive carbon fibers. The electrically conductive material may contain, for example, at least one selected from the group consisting of carbon black, vapor-grown carbon fibers (VGCFs), carbon nanotubes (CNTs), graphene flakes, and graphite. The carbon black may contain, for example, at least one selected from the group consisting of acetylene black, furnace black, channel black, and thermal black. For example, 0.1 parts by mass to 10 parts by mass of the electrically conductive material may be added per 100 parts by mass of the active material powder.

Solid Electrolyte

The solid electrolyte may be in the form of powder. The solid electrolyte may contain, for example, at least one selected from the group consisting of a sulfide solid electrolyte, an oxide solid electrolyte, and a borohydride solid electrolyte. The solid electrolyte may contain, for example, at least one selected from the group consisting of $Li_2S$—$P_2S_5$, $LiI$—$Li_2S$—$P_2S_5$, $LiBr$—$Li_2S$—$P_2S_5$, and $LiI$—$LiBr$—$Li_2S$—$P_2S_5$. For example, 1 parts by volume to 100 parts by volume of the solid electrolyte may be added per 100 parts by volume of the active material powder.

Binder

The binder may be in the form of powder. The binder may contain, for example, at least one selected from the group consisting of polyvinylidene difluoride (PVDF), polytetrafluoroethylene (PTFE), a polyvinylidene difluoride-hexafluoropropylene copolymer (PVDF-HFP), styrene butadiene rubber (SBR), carboxymethyl cellulose (CMC), polyimide (PI), polyamideimide (PAI), and polyacrylic acid (PAA). For example, 0.1 parts by mass to 10 parts by mass of the binder may be added per 100 parts by mass of the active material powder.

Additive

The additive may be in the form of powder. The additive can have any desired function. The additive may contain, for example, lithium phosphate. For example, 0.01 parts by mass to 10 parts by mass of the additive may be added per 100 parts by mass of the active material powder.

Electrically Conductive Material

The electrically conductive material can interfere with detection of breakage of the mesh screen by the classifier from a change in electrical resistance. Since the manufacturing method uses the classification system described above, breakage of the mesh screen can also be detected when the electrode material contains the electrically conductive material. The electrically conductive material may have a volume resistivity of, for example, less than $1\times10^2$ Ω·cm. Table 1 below shows the relationship between the volume resistivity of various materials and whether detection of breakage from a change in electrical resistance is possible. There is a tendency that, when the volume resistivity is less than $1\times10^2$ Ω·cm, it is difficult to detect breakage from a change in electrical resistance.

TABLE 1

| Material | | Volume Resistivity (Ω · cm) | Detection of Mesh Screen Breakage from Change in Electrical Resistance |
|---|---|---|---|
| Positive Electrode Active Material | $LiFePO_4$ | $<1 \times 10^2$ | Not Possible |
| Positive Electrode Active Material | $Li(NiCoMn)O_2$ | $>1 \times 10^2$ | Possible |
| Negative Electrode Active Material | Natural Graphite | $<1$ | Not Possible |

TABLE 1-continued

| | Material | Volume Resistivity ($\Omega \cdot$ cm) | Detection of Mesh Screen Breakage from Change in Electrical Resistance |
|---|---|---|---|
| Electrically Conductive Material Additive | Acetylene Black | <1 | Not Possible |
| | Lithium Phosphate | >1 × $10^6$ | Possible |

(b) Dry Classification

The manufacturing method includes performing dry classification of the electrode material by the classifier. A material to be subjected to the dry classification may be only the active material powder, or may be the electrode mixture. The dry classification of the manufacturing method can be performed by the classification system described above. Coarse particles (specific foreign matter) can be separated from the electrode material by the dry classification. When breakage of the mesh screen is detected while the classifier is in operation, the electrode material contained in the classifier at that time will not be used for electrode manufacturing.

Electrode Material

The electrode material with a reduced content of specific foreign matter (magnetic matter, Cu) can be manufactured by the dry classification. The content of the magnetic matter in the electrode material is 4 ppm or less by mass fraction. The magnetic matter can include, for example, Fe, iron oxide, and SUS-derived components. The SUS-derived components may include, for example, Ni, chromium (Cr), and manganese (Mn). The content of the magnetic matter may be, for example, 2.2 ppm or less, 1.9 ppm or less, 1.8 ppm or less, or 1.3 ppm or less. The content of the magnetic matter may be zero. The content of Cu in the electrode material is 1 ppm or less by mass fraction. The content of Cu may be zero.

Method for Quantifying Magnetic Matter

The magnetic matter can be quantified by the following procedure.
(1) N-methyl-2-pyrrolidone (NMP) is prepared as a dispersion medium. The electrode material is prepared as a sample. The sample is dispersed in the dispersion medium by a mixer. A particle dispersion is thus prepared.
(2) A bar magnet is immersed in the particle dispersion to collect magnetic matter contained in the particle dispersion.
(3) The bar magnet is removed from the particle dispersion. The magnetic matter attracted to the bar magnet is recovered. The magnetic matter may be recovered using, for example, an adhesive tape.
(4) The maximum diameter (dmax) of the magnetic matter and the particle count of the magnetic matter are measured using a microscope.
(5) The volume of the magnetic matter can be obtained by regarding the magnetic matter as spheres with a diameter of dmax. The density of the magnetic matter can be obtained from the composition of the magnetic matter. The mass fraction of the magnetic matter can be obtained from the volume, particle count, and density of the magnetic matter.

Method for Quantifying Cu

Cu can be quantified by the following procedure. It should be noted that "1 ppm" can be the detection limit in this procedure.
(1) The electrode material is prepared as a sample. A solution is formed by acid digestion of the sample.
(2) The solution is filtered to recover the residue and the filtrate.
(3) The residue is incinerated. After alkali fusion of the ash, acid extraction is performed.
(4) A sample liquid is prepared by mixing the filtrate obtained in (2) and the extract obtained in (3). The volume of the sample solution is adjusted.
(5) The sample solution is analyzed by inductively coupled plasma mass spectrometry (ICP-MS). The mass fraction of Cu is thus measured.

(c) Manufacturing of Electrode

The manufacturing method includes manufacturing an electrode by using the electrode material subjected to the dry classification.

(c1) Preparation of Paint

The manufacturing method may include, for example, preparing a paint. The paint contains the electrode material. For example, the electrode material in a dry state may be used as it is as the paint. For example, wet powder may be prepared by mixing the electrode material and a solvent. The wet powder may contain, for example, granules (agglomerate of granulated particles).

Solvent

The solvent is liquid. The solvent can facilitate particle agglomeration of the wet powder. The solvent may contain, for example, water and an organic solvent. The solvent may contain a component that can dissolve the binder. The solvent may contain, for example, at least one selected from the group consisting of water, butyl butyrate, and NMP.

(c2) Coating

The manufacturing method may include, for example, coating a surface of a base material with the paint. Any desired coating method can be used in the manufacturing method. A first coating method and a second coating method, which will be described later, are merely by way of example. For example, coating may be continuously performed by a roll-to-roll method. Such continuous coating is expected to improve productivity.

Base Material

The base material may be, for example, in the form of a sheet. The base material may be, for example, an electrode current collector. The base material may contain, for example, metal foil. The metal foil may contain, for example, at least one selected from the group consisting of aluminum (Al), Cu, Ni, titanium (Ti), Cr, and Fe. The base material may be, for example, Al foil or Cu foil. The base material may have a thickness of, for example, 5 μm to 50 μm, or 10 μm to 30 μm.

First Coating Method

Figures 5, 6:
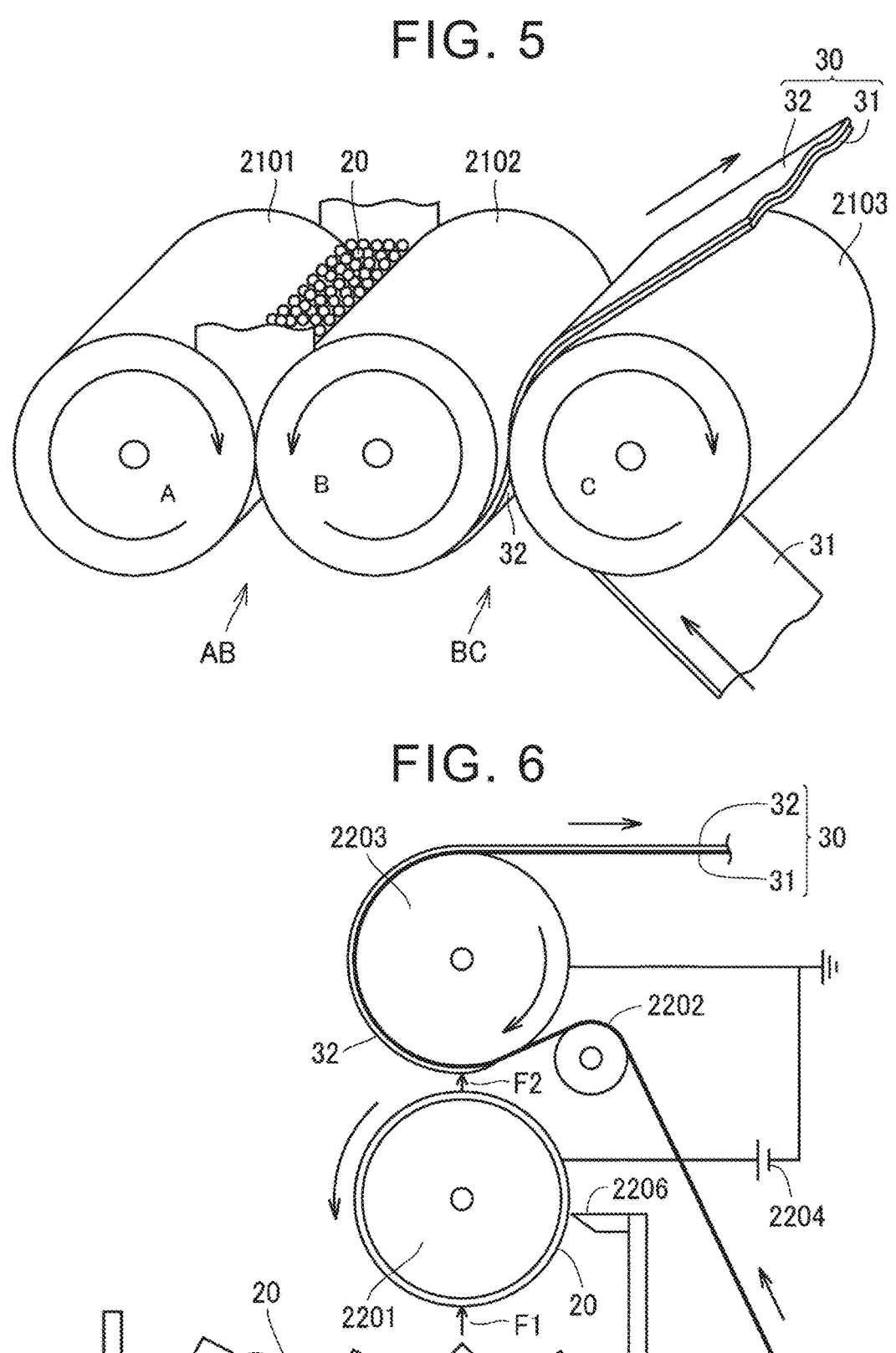
FIG. 5 is a schematic view illustrating a first coating method.
FIG. 6 is a schematic view illustrating a second coating method.

FIG. 5 is a schematic view illustrating the first coating method. The first coating method is similar to liquid film transfer. In the first coating method, a paint 20 may be, for example, wet powder. The paint 20 may have a solid content of, for example, 70% to 90%.

Three rolls are used in the first coating method. For example, a first roll 2101, a second roll 2102, and a third roll 2103 may be arranged side by side in the horizontal direction. The rotation axes of the rolls are parallel. The arrow shown in each roll indicates the rotational direction of that roll.

There is a first gap AB between the first roll 2101 and the second roll 2102. There is a second gap BC between the second roll 2102 and the third roll 2103.

The paint 20 is supplied into the first gap AB. An active material layer 32 is formed as the paint 20 is leveled in the first gap AB. The second roll 2102 transports the active material layer 32 into the second gap BC. The third roll 2103 transports a base material 31. The active material layer 32 is transferred to the base material 31 in the second gap BC. That is, an electrode 30 including the active material layer 32 and the base material 31 can be manufactured.

Second Coating Method

FIG. 6 is a schematic view illustrating the second coating method. Electrostatic coating is performed in the second coating method. In the second coating method, the paint 20 may be, for example, dry powder. The paint 20 may have a solid content of, for example, 90% to 100%.

The rotation axes of a first roll 2201, a second roll 2202, and a third roll 2203 are parallel. The third roll 2203 may be located vertically above the first roll 2201. A power supply 2204 forms an electric field between the first roll 2201 and the third roll 2203. The first roll 2201 is provided with a magnet.

The paint 20 is supplied to a container 2205. The paint 20 may be stirred in the container 2205. For example, a ferromagnetic material may be mixed with the paint 20 in the container 2205. The paint 20 is attracted to the first roll 2201 by a magnetic force F1 from the first roll 2201. The first roll 2201 transports the paint 20. A substantially constant amount of the paint 20 is supplied into the gap between the first roll 2201 and the third roll 2203 as a squeegee 2206 scrapes off a part of the paint 20.

The second roll 2202 transports the base material 31. The base material 31 is supplied into the gap between the first roll 2201 and the third roll 2203.

An electric field is formed in the gap between the first roll 2201 and the third roll 2203 so that an electrostatic force F2 acting on the paint 20 is greater than the magnetic force F1 acting on the paint 20. The paint 20 is separated from the first roll 2201 by the electrostatic force F2. The paint 20 then flies toward the third roll 2203 due to the electrostatic force F2. The base material 31 is supported on the surface of the third roll 2203. The active material layer 32 can be formed as the paint 20 adheres to the surface of the base material 31. That is, the electrode 30 including the active material layer 32 and the base material 31 can be manufactured.

Electrode

The electrode (primary sheet) can be manufactured in the manner described above. When the paint (active material layer) contains a solvent, the electrode may be dried. The active material layer may be fixed to the base material by, for example, applying either or both of pressure and heat to the active material layer.

The electrode may also be compressed to a predetermined thickness according to the battery design. The electrode may be cut into a predetermined planar shape according to the battery design.

The active material layer may be formed only on one surface of the base material. The active material layer may be formed on both front and back surfaces of the base material. The active material layer may have a thickness of, for example, 10 μm to 1000 μm. The active material layer may have a thickness of, for example, 50 μm to 200 μm.

The active material layer contains the electrode material. That is, the electrode includes the electrode material. The electrode material contains the active material powder. In the electrode, the content of the magnetic matter in the electrode material can also be 4 ppm or less. In the electrode, the content of Cu in the electrode material can also be 1 ppm or less.

First Experiment

The following materials were prepared.
Active material powder: $LiFePO_4$
Electrically conductive material: carbon nanotubes (CNTs)
Binder: CMC, SBR
Solvent: water

Manufacturing Example 1

The content of specific foreign matter (magnetic matter, Cu) in the active material powder was measured. The results are shown in Table 2 below.

Wet powder was produced by mixing the active material powder, the electrically conductive material, the binder, and the solvent in a planetary mixer. A three roll mill was prepared. The wet powder was kneaded by the three roll mill. The solid content of the wet powder was 75% or more.

An electrode was manufactured by the first coating method (see FIG. 5). A test battery including electrodes was also manufactured. The test battery was a small laminated battery.

Manufacturing Example 2

A test battery was manufactured in a manner similar to that of Manufacturing Example 1 except that magnetic separation of the active material powder was performed before production of the wet powder. The content of specific foreign matter in the active material powder was measured after the magnetic separation. The results are shown in Table 2 below.

Manufacturing Example 3

A test battery was manufactured in a manner similar to that of Manufacturing Example 1 except that dry classification of the active material powder was performed before production of the wet powder. The content of specific foreign matter in the active material powder was measured after the dry classification. The results are shown in Table 2 below.

Self-Discharge Test

Four test batteries (N1 to N4) were manufactured in each manufacturing example. A self-discharge test was performed on each test battery. The results are shown in Table 2 below. In Table 2, "OK" means that the voltage drop was 0.7 mV or less, and, and "NG" means that the voltage drop was more than 0.7 mV.

TABLE 2

| | | Manufacturing Example 1 | Manufacturing Example 2 | Manufacturing Example 3 |
|---|---|---|---|---|
| Process of Reducing Foreign Matter | | No Process Performed | Magnetic Separation | Dry Classification |
| Content of Specified Foreign Matter | Magnetic Matter (ppm)[1] | 5.2 | 2.5 | 1.3 |
| | Cu (ppm) | 1.4 | 1.2 | ≤1[2] |
| Self-Discharge Test | N1 Voltage Drop (mV) | 1.24 | 0.66 | 0.54 |
| | Judgement | NG | OK | OK |
| | N2 Voltage Drop (mV) | 0.98 | 0.98 | 0.66 |
| | Judgement | NG | NG | OK |
| | N3 Voltage Drop (mV) | 1.54 | 1.02 | 0.52 |
| | Judgement | NG | NG | OK |
| | N4 Voltage Drop (mV) | 1.10 | 0.59 | 0.36 |
| | Judgement | NG | OK | OK |

[1] Mass fraction. The same applies to Table 3.
[2] Detection limit or less. The same applies to Table 3.

Results

There is a tendency that the higher the content of the specific foreign matter, the larger the voltage drop. The content of the specific foreign matter was the lowest in Manufacturing Example 3 (dry classification). The voltage drop in the self-discharge test was also the smallest in Manufacturing Example 3.

Second Experiment

A classification system was prepared. The classification system included a classifier and a detector. The detector was configured to detect breakage of a mesh screen by monitoring either or both of the operation sound of the classifier and the torque of a motor.

Manufacturing Example 4

In Manufacturing Example 4, the classifier was operated for six hours with the detector not in operation (OFF state). The content of the specific foreign matter was measured for each of the active material powder after one-hour classification, the active material powder after three-hour classification, and the active material powder after six-hour classification. The results are shown in Table 3 below.

Manufacturing Example 5

In Manufacturing Example 5, the classifier was operated for six hours with the detector in operation (ON state). When the detector detected breakage of the screen mesh, the classifier was stopped, the active material powder being classified was discharged, and the screen mesh was replaced. The operation of the classifier was resumed after the active material powder and the screen mesh are replaced. The content of the specific foreign matter was measured for each of the active material powder after one-hour classification, the active material powder after three-hour classification, and the active material powder after six-hour classification. The results are shown in Table 3 below.

TABLE 3

| | | | Manufacturing Example 4 | Manufacturing Example 5 |
|---|---|---|---|---|
| Detector (detects breakage of mesh screen) | | | OFF | ON |
| After 1 h Classification | Content of Specified Foreign Matter | Magnetic Matter (ppm) | 1.4 | 2.2 |
| | | Cu (ppm) | ≤1 | ≤1 |
| After 3 h Classification | Content of Specified Foreign Matter | Magnetic Matter (ppm) | 1.9 | 1.8 |
| | | Cu (ppm) | ≤1 | ≤1 |
| After 6 h Classification | Content of Specified Foreign Matter | Magnetic Matter (ppm) | 4.3 | 1.9 |
| | | Cu (ppm) | 1.1 | ≤1 |

Results

There is a tendency that the quality (content of specific foreign matter) is stabilized over a long period of time by detecting breakage of the screen mesh.

Additional Notes

The embodiment also supports a "method for manufacturing an electrode material."
The method for manufacturing an electrode material includes the following (a) and (b):
(a) preparing an electrode material containing active material powder; and
(b) manufacturing an electrode material by performing dry classification of the electrode material by a classifier.
The classifier includes a mesh screen, a blade, and a motor. The mesh screen has a tubular outer shape. The mesh screen is electrically insulating. The mesh screen is configured to separate coarse particles from the electrode material. The motor is configured to rotate the blade along an inner peripheral surface of the mesh screen. The blade is configured to press the electrode material against the mesh screen.

The above (b) includes detecting breakage of the mesh screen by monitoring either or both of an operation sound of the classifier and torque of the motor.

The embodiment and the examples are illustrative in all respects. The embodiment and the examples are not restrictive. The technical scope of the present disclosure includes all modifications that fall within the meaning and scope equivalent to the claims. For example, it is planned from the beginning to extract desired configurations from the embodiment and the examples and combine the extracted configurations as desired.

What is claimed is:

1. A classification system for performing dry classification of an electrode material, the classification system comprising:

a classifier; and a detector, wherein:

the classifier includes a mesh screen, a blade, and a motor;

the mesh screen has a tubular outer shape;

the mesh screen is electrically insulating;

the mesh screen is configured to separate coarse particles from the electrode material;

the blade is configured to press the electrode material against the mesh screen;

the motor is configured to rotate the blade along an inner peripheral surface of the mesh screen;

the detector is configured to detect breakage of the mesh screen by monitoring torque of the motor; and the detector is configured to determine that the breakage has occurred when the torque falls out of a reference range, wherein the reference range is a range used to determine whether the classifier should be stopped.

2. The classification system according to claim 1, further comprising a controller, wherein the controller is configured to stop the classifier when the breakage is detected by the detector.

3. The classification system according to claim 1, wherein:

the detector is configured to determine that the electrode material contained in the classifier is defective when the breakage is detected; and the detector is configured to redetermine that the electrode material determined to be defective is non-defective when the electrode material determined to be defective is subjected again to the dry classification.

* * * * *